UNITED STATES PATENT OFFICE.

DANIEL M. LAMB, OF STRATHROY, CANADA.

IMPROVEMENT IN TREATING VULCANIZABLE GUMS AND CAOUTCHOUC.

Specification forming part of Letters Patent No. 144,623, dated November 18, 1873; application filed November 10, 1873.

*To all whom it may concern:*

Be it known that I, DANIEL MARTIN LAMB, of Strathroy, in the county of Middlesex and Province of Ontario, Canada, have invented certain new and useful Improvements in Manufacturing and Treating Vulcanizable Gum and Hydrocarbon Oils, of which the following is a specification:

My invention relates in part to the treatment of the vulcanizable gum produced from plants of the asclepias or milkweed family, or other plants possessing like properties. My present improvements are based on the discovery that this gum, when dissolved in petroleum or any of the liquid products of the same, imparts to the said liquid a fatty property, adding greatly to its value for illuminating and other purposes, the gum being also greatly benefited by the change.

In carrying out the invention, the milkweed is cut with a mowing-machine, preferably while it is in bloom, and is cured or dried, as in making hay; or it may be used green, if preferred. When dried, the gum is rendered insoluble in water. It is then cut up into chaff with a suitable machine for this purpose. It is afterward cooked for three days, more or less, by either steaming or boiling, so as to disintegrate the fiber, and is then pressed to expel water. The gum, being insoluble and less fluid, does not escape with the water, but remains with the solid matter. The latter, containing the gum, is then stowed in cribs or boxes, and left for three days, more or less, to ferment. This causes the gum to exude from the fibrous matter. The whole is then placed together in a tight vessel with a quantity of benzine, naphtha, gasoline, or other analogous solvent, and kept for two weeks, more or less, until the gum is completely dissolved. For this purpose five barrels of naphtha or gasoline will suffice for a ton of the dried weed; but in practice a much larger quantity of the liquid is used, the effect of the gum upon the liquid being one object sought. The solution is drawn off into a still, the fiber being subsequently pressed to expel the solution therefrom as completely as possible. The solution is then distilled in the usual manner, the vapor carrying over with it a considerable amount of oil or fatty matter derived from the milkweed, which greatly improves the oil for illuminating and other purposes. At the same time the gum is found to be greatly improved by the separation of the fatty matter and by the tarry residuum which it retains from the oil.

Care is taken to avoid subjecting the residuum to sufficient heat to injure the gum for any subsequent treatment or purpose for which it may be designed.

This matter, consisting of cleansed gum, with such residuum as may have been left by the oil, is then removed from the still in proper consistency for molding, or may be further dried by exposure, and it is subsequently vulcanized or treated in any manner common with ordinary caoutchouc.

Good results are obtained by employing crude petroleum as a solvent to separate the gum from its fiber in the manner already described, and subjecting this solution to successive or graduated distillation, the lighter oils being obtained first and the heavy oil subsequently under any of the well-known processes.

Still another manner of applying my invention consists in employing as the solvent heavy oil, from which the light oils have been distilled out in customary manner. The gum being dissolved in this heavy oil, the solution is subsequently distilled, the gum being improved by the treatment as before, while the heavy oil is greatly improved for lubricating and other purposes.

The treatment of petroleum or any of its liquid products with asclepias gum under this process effectually deodorizes it, so that the chemicals usually employed for this purpose may be entirely dispensed with.

Avoiding the necessity of costly treatment with chemicals for deodorization constitutes one of the important features of economic value in the invention.

The following is claimed as new:

The mode or process herein described for the combined treatment of vulcanizable gum and petroleum, or any product thereof, by dissolving the gum in the oil, and subsequently distilling the solution, as and for the purposes set forth.

D. M. LAMB.

Witnesses:
 EDM. F. BROWN,
 OCTAVIUS KNIGHT.